United States Patent [19]
Koehlert et al.

[11] Patent Number: 5,928,723
[45] Date of Patent: Jul. 27, 1999

[54] PROGRESS FOR PRODUCING SURFACE MODIFIED METAL OXIDE COMPOSITIONS

[75] Inventors: Kenneth C. Koehlert, Champaign, Ill.; Douglas M. Smith, Albuquerque, N.M.; William C. Ackerman, Champaign, Ill.; Stephen Wallace, Albuquerque, N.M.; David J. Kaul, Champaign, Ill.

[73] Assignee: Cabot Corporation, Boston, Mass.

[21] Appl. No.: 08/826,978

[22] Filed: Apr. 9, 1997

[51] Int. Cl.⁶ .................................................. B05D 7/00
[52] U.S. Cl. .................... 427/213; 427/215; 427/220; 427/301; 556/400; 556/442; 556/457; 556/482
[58] Field of Search .................................. 427/215, 220, 427/213, 301; 556/482, 457, 442, 400

[56] References Cited

U.S. PATENT DOCUMENTS

| | | | |
|---|---|---|---|
| 2,736,669 | 2/1956 | Goebel | 427/220 |
| 2,739,075 | 3/1956 | Iler | 106/308 |
| 2,973,282 | 2/1961 | Gross | 427/220 |
| 3,956,179 | 5/1976 | Sebastian et al. | 252/430 |
| 4,150,101 | 4/1979 | Schmidt et al. | 423/338 |
| 4,561,872 | 12/1985 | Luong et al. | 65/18.1 |
| 5,017,540 | 5/1991 | Sandoval et al. | 502/158 |
| 5,030,515 | 7/1991 | Ozawa et al. | 427/410 |
| 5,326,738 | 7/1994 | Sandoval et al. | 503/401 |
| 5,376,449 | 12/1994 | Harris et al. | 504/402 |
| 5,409,683 | 4/1995 | Tillotson et al. | 423/338 |

FOREIGN PATENT DOCUMENTS

| | | |
|---|---|---|
| 9425149 | 11/1994 | WIPO . |
| 9612683 | 5/1996 | WIPO . |

OTHER PUBLICATIONS

Shioji, S. et al., "Surface Alkoxylation . . . with Alcohols", Bull. Chem. Soc. Jpn., vol. 65, No. 3, pp. 728–734, 1992. (No month).

Ballard, C.C., et al., "Esterification of the Surface of Amorphous Silica", Industrial and Biochemical Dept., E.I. du Pont de Nemours & Co., Inc. Wilmington, Del., vol. 65, pp. 20–25, 1961. (No month).

Heinrich et al., Aerogels–Nanoporous Materials, Part I: Sol–Gel Process and Drying of Gels, Journal of Porous Materials, vol. 1, pp. 7–17 (1995). (No month).

Smith et al., "Preparation of Low–Density Xerogels at Ambient Pressure", Journal of Non–Crystalline Solids, vol. 186, pp. 104–112 (1994). (no month).

Arzak et al., The Journal of Physical Chemistry, vol. 77, No. 26, pp. 3048–3052, Dec. 1973.

Utsugi et al., Shikizai Kyokaishi, vol. 48, No. 6, pp. 372–377 (no month), 1975.

*Primary Examiner*—Shrive Beck
*Assistant Examiner*—Timothy Meeks

[57] ABSTRACT

A process for producing surface modified metal oxide and/or organo-metal oxide compositions comprising esterifying at least a portion of the metal oxide and/or organo-metal oxide composition through contact with at least one esterification agent and at least one catalyst wherein the esterification agent and the catalyst are in the liquid phase. The process may be utilized to produce hydrophobic metal oxide and/or organo-metal oxide compositions at ambient temperature and/or ambient pressure conditions.

25 Claims, 3 Drawing Sheets

PROGRESS FOR PRODUCING SURFACE MODIFIED METAL OXIDE COMPOSITIONS

FIELD OF THE INVENTION

The present invention relates to a process for producing surface modified producing metal oxide and/or organo-metal oxide compositions, including powders and gels. The process may be utilized to produce surface modified compositions at ambient temperature and/or ambient pressure conditions.

BACKGROUND

Metal oxide and/or organo-metal oxide compositions, including gel compositions comprising metal oxide and/or organo-metal oxides, are utilized in a variety of applications including insulation; particulate additives, including flatting agents, thickeners, fillers and reinforcing agents; adsorbents; catalyst supports; membranes; filters; radiation detectors; coatings; and dielectrics. Metal oxide and organo-metal compositions which are utilized in these applications include, but are not limited to, oxides and organo-oxides of silicon, titanium, zirconium, aluminum, iron, magnesium, molybdenum, manganese, boron, copper, zinc, vanadium, tin, nickel, tantalum, niobium, lead, yttrium or mixtures thereof. The term organo-metal oxide refers to a composition comprising a metal oxide and an organic material (i.e. a material comprising $CH_x$ functionality) which may additionally comprise other chemical groups.

Metal oxide and organo-metal oxide compositions are produced in many forms depending on their intended application. The physical forms of metal oxides and organo-metal oxide solids include powders, whiskers, platelets and fibers.

As set forth above, metal oxide and organo-metal oxide compositions also include gels comprising a metal oxide and organo-metal oxide. The term "gel" encompasses wet gels, including hydrogels and alcogels; and gels dried from the wet gels including aerogels and xerogels. The term "aerogel" was coined by S. S. Kistler in U.S. Pat. No. 2,188,007 and is generally utilized to refer to a gel which has been dried under supercritical temperature/pressure conditions. Gels, in particular aerogels, are utilized in a wide variety of applications, including thermal and acoustic insulation, catalyst supports and carriers, filters and molecular sieves, rheology control agents, reinforcing agents, thickeners and electronics, as well as the applications listed above.

Surface modified metal oxide and/or organo-metal oxide compositions have utility in many applications. For example hydrophobic metal oxide and/or organo-metal oxide compositions may be used for reinforcement and/or rheology control in elastomers and/or sealants, for example in RTV-2 (2 component, room temperature, vulcanized) type silicone sealants. Hydrophobic metal oxide and/or organo-metal oxide compositions may also be used to provide corrosion resistance and hydrophobicity in coatings. Further, hydrophobic metal oxide and/or organo-metal oxide compositions may act as a free flow agent for powdered materials to prevent caking. For example, hydrophobic metal oxide and/or organo-metal oxide compositions may be utilized in fire extinguishing powders, powdered polymers, pigments, toners, herbicides and insecticides. Still further, hydrophobic metal oxide and/or organo-metal oxide compositions may be utilized to provide rheology control and water resistance in polyester resins, in insulation coatings for moisture sensitive applications, for anti-settling purposes in aerosol paints, and for reinforcement and water repellency in dental compounds. In addition, hydrophobic metal oxide and/or organo-metal oxide compositions may be utilized as fillers, for reinforcement and rheology control rubber compositions, for example silicone rubber RTV-2 (2 component, room temperature vulcanized) compositions.

Surface modification may also be useful for other reasons. For example, surface modification may be utilized to modify the surface chemistry of the metal oxide and/or organo-metal oxide to render the metal oxide and/or organo-metal oxide more advantageous for use in particular applications. Surface modification may also be utilized to modify the dispersion characteristics of a metal oxide and/or organo-metal oxide, the adsorption characteristics of a metal oxide and/or organo-metal oxide or to modify the receptivity of the surface of the metal oxide and/or organo-metal oxide to bond to other compounds, such as coupling agents.

Metal oxide and/or organo-metal oxide compositions may comprise a fumed (pyrogenic) metal oxide, a colloidal based metal oxide, ceramic whiskers, glass fibers or a gel comprising metal oxide and/or organo-metal oxide. In the case of silica, fumed silica is generally produced by the vapor phase hydrolysis of chlorosilanes, such as silicon tetrachloride, in a hydrogen/oxygen flame. In this process, submicron sized molten spheres of silica are formed. These particles collide and fuse to form three dimensional branched, chain-like aggregates. Cooling takes place very quickly, limiting the particle growth and ensuring that the fumed metal oxide and/or organo-metal oxide is amorphous. These aggregates in turn become mechanically entangled to form agglomerates. Generally fumed silicas have B.E.T. (Brunauer Emmett Teller determined) surface areas ranging from about 50 to about 400 square meters per gram (sq.m/g). In addition, fumed silicas generally have very high purity, with total impurities, in many cases below 100 ppm.

It would be advantageous to have a process for producing surface modified metal oxide and/or organo-metal oxide compositions at ambient temperatures and/or ambient pressures.

SUMMARY OF THE INVENTION

The present invention provides processes for producing surface modified metal oxide and/or organo-metal oxide compositions comprising esterifying at least a portion of the surface of a metal oxide and/or organo-metal oxide composition through contact with at least one esterification agent and at least one catalyst. Preferably at least 20% of the surface of the gel composition is esterified through contact with the esterification agent and the catalyst.

In a first aspect, the process of the present invention for producing a surface modified metal oxide and/or organo-metal oxide composition comprises:

esterifying at least a portion of the surface of a metal oxide and/or organo-metal oxide composition through contact with at least one esterification agent in the presence of at least one catalyst wherein the esterification agent and the catalyst are in the liquid phase and the process is conducted at a pressure of less than or equal to 300 psia (pounds per square inch absolute).

In a second aspect, the process of the present invention for producing a surface modified metal oxide and/or organo-metal oxide composition comprises:

esterifying at least a portion of the surface of a metal oxide and/or organo-metal oxide composition through sequential contact with at least one esterification agent and at least one catalyst wherein the esterification agent and the catalyst are in the liquid phase and the process is conducted at a pressure of less than or equal to 300 psia (pounds per square inch absolute).

An advantage of the processes for producing surface modified metal oxide and/or organo-metal oxide compositions is that the processes may be performed at ambient temperatures and/or ambient pressures.

Another advantage of the processes for producing surface modified metal oxide and/or organo-metal oxide compositions is that the processes may be utilized to produce metal oxide and/or organo-metal oxide compositions with increased hydrophobicity or increased hydrophilicity.

A further advantage of the processes of the present invention is that the processes may be utilized to add chemical functionality to the surface of a metal oxide and/or organo-metal oxide.

The features and advantages of the process of the present invention are described in more detail in the following sections.

DETAILED DESCRIPTION OF THE INVENTION

Figure 1:
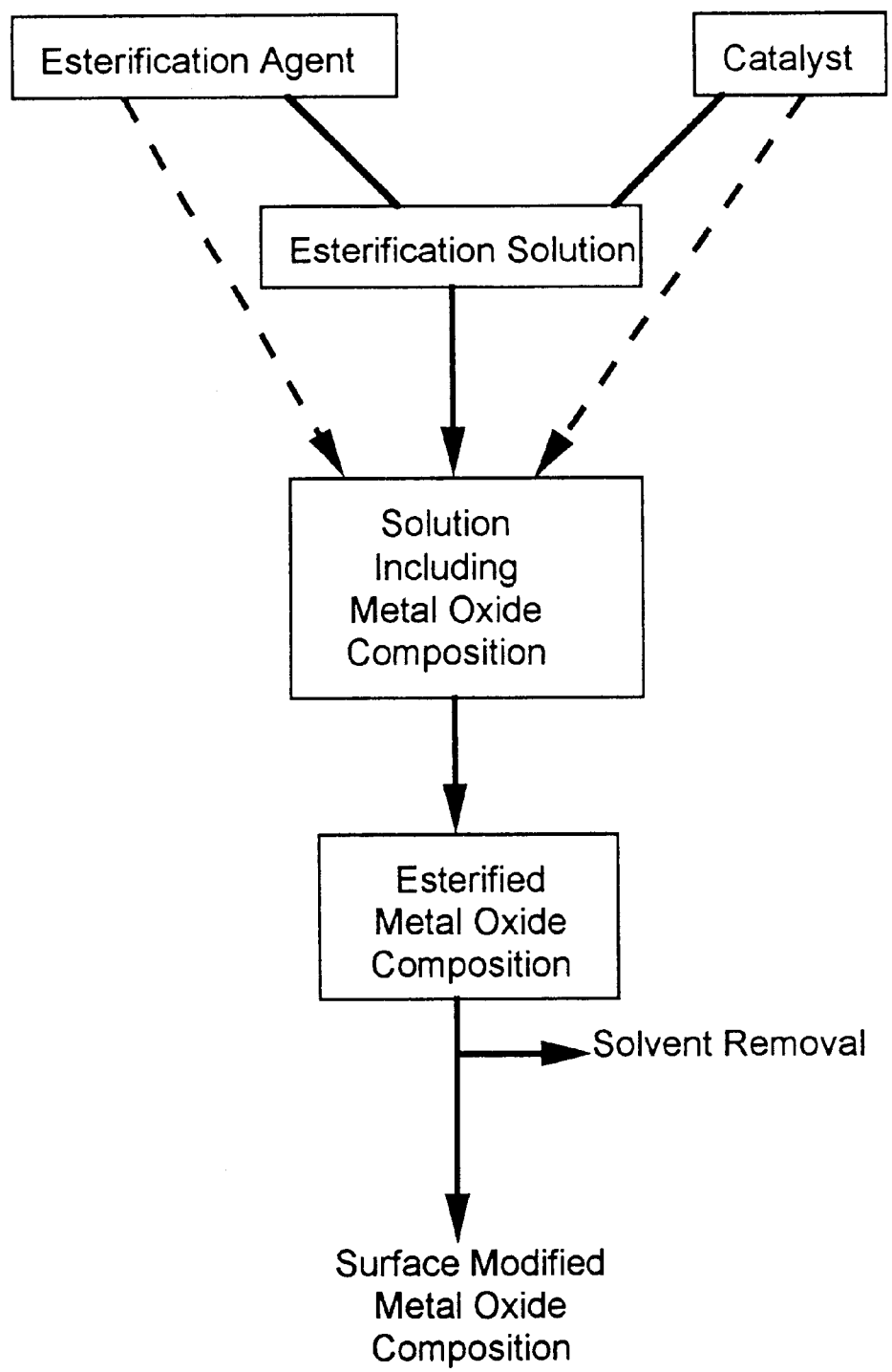
FIG. 1 is a schematic diagram of an embodiment of a process of the present invention for producing surface modified metal oxide and/or organo-metal oxide compositions.

According to the present invention, a process for producing surface modified metal oxide and/or organo-metal oxide compositions comprises esterifying at least a portion of the surface of a metal oxide and/or organo-metal oxide composition through contact with at least one esterification agent and at least one catalyst. Preferably at least 20% of the surface of the gel composition, more preferably at least 35% of the surface, even more preferably at least 50% of the surface is esterified through contact with the esterification agent and the catalyst. The percentage of the surface which is esterified may be determined in the manner set forth below.

As used herein, with reference to the surface of the gel composition, the term "esterfied" means comprises an ester group (R—O—), where R is a chemical group found in the esterification agent.

An embodiment of a process of the present invention for producing surface modified metal oxide and/or organo-metal oxide compositions comprises:

esterifying at least a portion of a surface of the metal oxide and/or organo-metal oxide composition, preferably esterifying at least 20% of the surface, more preferably esterifying at least 35% of the surface, even more preferably esterifying at least 50% of the surface through contact with at least one esterification agent in the presence of at least one catalyst wherein the esterification agent and the catalyst are in the liquid phase and the process is conducted at a pressure of less than or equal to to 300 psia, preferably at a pressure of less than or equal to 100 psia, more preferably less than or equal to 30 psia, more preferably less than or equal to 16 psia. This embodiment of a process of the present invention is preferably performed at a temperature less than or equal to the atmospheric boiling point of the esterification agent, more preferably less than 100° C., more preferably less than 80° C.

As used herein, the term "atmospheric boiling point" refers to the boiling point at standard atmospheric conditions of 1 atmosphere (14.7 psia).

Another embodiment of a process of the present invention for producing surface modified metal oxide and/or organo-metal oxide compositions comprises:

esterifying at least a portion of the surface of a metal oxide and/or organo-metal oxide composition, preferably esterifying at least 20% of the surface, more preferably esterifying at least 35% of the surface, even more preferably esterifying at least 50% of the surface, through sequential contact with at least one esterification agent and at least one catalyst wherein the esterification agent and the catalyst are in the liquid phase and the process is conducted at a pressure of less than or equal to to 300 psia, preferably at a pressure of less than or equal to 100 psia, more preferably less than or equal to 30 psia, more preferably less than or equal to 16 psia. The sequential contact may comprise contacting the metal oxide and/or organo-metal oxide composition with the esterification agent and then the catalyst, or contacting the metal oxide and/or organo-metal oxide composition with the catalyst and then the esterification agent. This embodiment of a process of the present invention is preferably performed at a temperature less than or equal to the atmospheric boiling point of the esterification agent, more preferably less than 100° C., more preferably less than 80° C.

The processes of the present invention may be carried out utilizing conventional laboratory and industrial scale mixing vessels and equipment for handling metal oxide and/or organo-metal oxide compositions, including metal oxide and/or organo-metal oxide gels. The choice of the particular equipment utilized to practice the processes of the present invention is believed to be within the skill of one of ordinary skill in the art and therefore is not described in greater detail.

As will be recognized by one of ordinary skill in the art from the description and examples set forth herein, the processes of the present invention may be performed as continuous or batch processes.

The processes of the present invention are conducted while the esterification agent and the catalyst are in the liquid phase. Thus, the temperature, pressure and other process conditions should be such that the esterification agent and the catalyst remain in the liquid phase throughout the process. Generally, it is preferred to conduct the processes of the present invention at pressures near ambient, for example 10 to 20 psi, and temperatures below approximately 100° C.

Metal oxide compositions which may be treated according to the processes of the present invention to produce surface modified metal oxide and/or organo-metal oxide compositions include, but are not limited to, metal oxide and/or organo-metal oxide compositions comprising the following metal elements/oxides, and combinations of these elements/oxides listed in the Table below.

| Metal | Examples of Forms as Metal oxide organo-metal oxide, and composites |
|---|---|
| aluminum (Al) | $Al_2O_3$, AlN, $Al_4C_3$, Al(O)OH, $Al(OH)_3$ |
| boron (B) | $B_2O_3$, BN, $B_4C$ |
| copper (Cu) | CuO, $Cu(OH)_2$, $Cu_3N$ |
| iron (Fe) | FeO, $Fe_2O_3$, $Fe_3O_4$, $Fe_3C$, $Fe(OH)_2$ |
| lead (Pb) | PbO, $PbO_2$ |
| magnesium (Mg) | MgO, $Mg(OH)_2$ |
| manganese (Mn) | $MnO_2$, $Mn_3C$, $Mn_2O_3$, $MnO_3$ |
| molybdenum (Mo) | $MoO_2$, $Mo_2O_3$, $MoO_3$, MoC, $Mo_2C$, $Mo_2O_5$ |

-continued

| Metal | Examples of Forms as Metal oxide organo-metal oxide, and composites |
|---|---|
| nickel (Ni) | NiO, NiB, Ni$_3$C |
| niobium (Nb) | Nb$_2$O$_5$, NbB$_2$, NbC, NbN, NbO, NbO$_2$ |
| silicon (Si) | SiO$_2$, CH$_3$SiO$_{1.5}$, SIC, Si$_3$N$_4$, (CH$_3$)$_x$SiO$_{2-x/2}$ |
| tantalum (Ta) | Ta$_2$O$_5$, TaC, TaN |
| tin (Sn) | SnO, SnO$_2$ |
| titanium (Ti) | TiN, TiB$_2$, TiC TiO$_2$ |
| vanadium (V) | VC, V$_2$O$_4$, V$_2$O$_5$ |
| yttrium (Y) | YC$_2$, Y(OH)$_3$, Y$_2$O$_3$ |
| zinc (Zn) | ZnO, Zn$_3$N$_2$ |
| zirconium (Zr) | ZrC, ZrN, ZrO$_2$ |

Metal oxide and organo-metal oxide composite compositions, including but not limited to, mixtures of the above identified metal oxides may also be produced according to the process of the present invention.

The term organo-metal oxide refers to a composition comprising a metal oxide and an organic material (i.e. a material comprising CH$_x$ functionality) which may additionally comprise other chemical groups.

The listing of metals, metal oxide and/or organo-metal oxides, and composites set forth above is not exhaustive. The process of the present invention may be utilized with other metal oxide and/or organo-metal oxide compositions known in the art, including gel compositions comprising a metal oxide and/or organo-metal oxide.

In the processes of the present invention, the esterification reaction is believed to esterify (—OH) groups on the surface of the metal oxide and/or organo-metal oxide composition. For example, in the case of silica, the esterification reaction is believed to esterify silanol (—Si—OH) groups on the surface of the silica composition. If desired, the metal oxide and/or organo-metal oxide composition may be pre-treated to produce (—OH) surface groups for esterification. Suitable pre-treating agents include aqueous bases (hydroxyl ion donors) such as ammonium hydroxide.

The portion of the surface of a metal oxide and/or organo-metal oxide which has been esterified may be determined by thermogravimetric analysis of a sample of the surface modified metal oxide and/or organo-metal oxide compositions in manners set forth below. An example of a thermogravimetric analysis technique which was utilized in the examples herein is described below.

As will be understood by those of ordinary skill in the art, the degree to which the surface of a metal oxide and/or organo-metal oxide composition is esterified will affect the properties of the metal oxide and/or organo-metal oxide composition and thus the suitability of the metal oxide and/or organo-metal oxide composition for use in particular applications. It is generally preferred that the surface of a surface modified metal oxide and/or organo-metal oxide composition produced by a process of the present invention be sufficiently esterified to render the surface modified metal oxide and/or organo-metal oxide suitable for its intended end use. For example, in the case of surface modified silica compositions produced utilizing ethanol as at least one esterification agent and intended for use as hydrophobic thermal insulation, it is preferred that at least 25% of the surface of the composition be esterified.

Catalysts suitable for use in the processes of the present invention include any catalyst which catalyzes the esterification reaction to an extent sufficient to esterify a portion of the surface of the metal oxide and/or organo-metal oxide composition, preferably esterifying at least 20% of the surface, more preferably esterifying at least 35% of the surface, even more preferably esterifying at least 50% of the surface.

Suitable catalysts include bases (hydroxyl ion donors). Preferred catalysts have simple stereochemistry and may or may not react directly with the silica surface groups. It is also generally preferred for the catalyst to be soluble in water. Preferred catalysts also have a boiling point which differs from the boiling point of the esterification agent to facilitate separation and recovery of the esterfication agent and catalyst. In a process wherein the catalyst and the esterification agent are different compositions, it is preferable for the catalyst to be able to be separated from the esterification agent. It is also preferred that the catalyst have a boiling point greater than the temperature at which the esterification is conducted.

Among the catalysts suitable for use in the processes of the present invention are included Lewis Bases such as ammonia (NH$_3$), amines and alcoholamines. Amines have the general formula, R$_{3-x}$NH$_x$ where R comprises an alkyl and/or aryl group. Alkyl amines include, methylamine, dimethylamine, trimethylamine, ethyl amine, isopropylamine, n-butylamine, sec-butylamine, tert-butylamine, n,n dimethylbutylamine, 2-methoxyethylamine, cyclohexylamine, triethylenediamine, ethylenediamine, tetramethylenediamine, hexamethylenediamine, and tetramethylammonium hydroxide. Aromotic amines include aniline, methylaniniline, and diphenylamine. Alcoholamines are similar to the amines except that one or more of the alkyl or aryl R groups contain a hydroxyl group such as monoethanolamine (H$_2$NC$_2$H$_4$OH). Other examples of alcoholamines include: diethanolamine, triethanolamine, monopropanolamine, dipropanolamine, monoisopropanolamine, diisopropanolamine, mono-sec-butanolamine, di-sec-butanolamine, 2 amino-2-methyl-1-propanol, N-methylethanolamine, N-butylethanolamine and, diperidine.

Esterification agents suitable for use in the processes of the present invention include chemical compositions which will react with the surface of the metal oxide and/or organo-metal oxide composition to esterify a portion of the surface of the metal oxide and/or organo-metal oxide composition, preferably esterifying at least 20% of the surface, more preferably esterifying at least 35% of the surface, even more preferably esterifying at least 50% of the surface.

Generally the esterification agent will comprise a carbon atom and a hydroxyl group bonded to the carbon atom. The hydroxyl group will react with surface groups on the metal oxide and/or organo-metal oxide composition to modify the surface of the metal oxide and/or organo-metal oxide. In the case of silica, it is believed that the hydroxyl group reacts with silanol groups on the silica surface as follows:

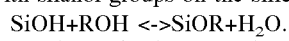

SiOH+ROH <->SiOR+H$_2$O.

As shown in the example esterification reaction above, after esterification a chemical group (R) from the esterification agent remains on the surface of the metal oxide and/or organo-metal oxide composition. Accordingly, where desired for a particular end use, a process of the present invention may be utilized to add chemical functionality to the surface of the resulting composition. For example, an esterification agent comprising allyl alcohol (discussed below) may be utilized to add vinyl functionality to the surface of the composition.

Suitable esterification agents include alcohols of the general formula ROH where R comprises an alkyl group or substituted alkyl group, including an alkylamine. The alcohol may comprise a primary alcohol, a secondary alcohol, a tertiary alcohol, and may further comprise halogen atoms, double bonds and/or an aromatic ring.

Suitable alcohols include methanol, ethanol, n-propanol, isopropanol, n-butanol, sec-butanol, isobutanol, terbutanol, n-hexanol, n-octanol, n-decanol, n-octadecyl alcohol, cyclohexanol, benyzyl alcohol, allyl alcohol and trifluoroethanol. Suitable alcohols also include alcohols comprising multiple hydroxyl groups (diols or polyols) for example, ethylene glycol, 1,2 propylene glycol, 1,3 propylene glycol, 1,4 butane diol, glycerol and diols with sulfur substitution such as $HOC_2H_4S.SC_2H_4OH$ and $HOC_2H_4S.S.S.SC_2H_4OH$. Suitable esterification agents further include phenols, i.e. esterification agents wherein a hydroxyl group or groups is/are bound to a carbon atom or carbon atoms in an aromatic ring, for example phenol, o-cresol, m-cresol, p-cresol, catechol, resorcinol and hydroquinone.

Preferred alcohols include unbranched primary $C_1$–$C_4$ hydrocarbons, including methanol, ethanol, butanol and propanol.

Preferably the esterification agent is soluble in water and has a boiling points above the temperature at which the esterification is conducted.

In the processes for producing surface modified metal oxide and/or organo-metal oxide compositions a single composition may be the esterification agent and the catalyst. Compositions which will function as both at least one catalyst and at least one esterification agent include organic compounds comprising amino and hydroxyl groups, for example alkanolamines, including the alkanolamines set forth above.

As will be recognized by those of ordinary skill in the art, the esterification reaction will generate water ($H_2O$). In addition, residual water may be present on the surface of the metal oxide and/or organo-metal oxide.

The presence of water will negatively affect the esterification reaction. In the process of the present invention, the amount of water present should be maintained at a level sufficient to allow substantially all of the esterification reactions to proceed to completion. Preferably, the amount of water present in the solution including the metal oxide and/or organo-metal oxide composition, wherein the esterification reaction is proceeding, is 5.0% or less, by weight, more preferably 1.0% or less, by weight, even more preferably 0.1% or less, by weight.

According to the present invention, the esterification reaction is conducted while the esterification agent and the catalyst are in the liquid phase (e.g. liquids). One method for reacting the esterification agent with the metal oxide and/or organo-metal oxide composition in the presence of the catalyst is by forming an esterification solution comprising the esterification agent and the catalyst. Preferably, the catalyst is present in an amount of 0.5 to 80% by weight, of the metal oxide and/or organo-metal oxide composition, in a solution comprising the catalyst and the esterification agent. More preferably, the catalyst is present in an amount of 0.5 to 5%, by weight, of the metal oxide and/or organo-metal oxide composition, and even more preferably, the catalyst is present in an amount of 0.5 to 2%, by weight, of the metal oxide and/or organo-metal oxide composition, in a solution comprising the catalyst and the esterification agent. The remainder of the esterification solution may comprise the esterification agent, and may further include a solvent. Preferably, the esterfication agent is present in an amount of up to 1.5%, by weight, of the metal oxide and/or organo-metal oxide composition in the esterification solution. More preferably the esterification agent is present in an amount of 0.1 to 1.5% by weight, of the metal oxide and/or organo-metal oxide composition in the esterification solution. The remainder of the esterification solution, if the solution is not entirely esterification agent and catalyst, may comprise a solvent. Suitable solvents include: non-linear alcohols and aprotics.

Thus, in more detail, a process of the present invention for producing surface modified metal oxide and/or organo-metal oxide compositions may comprise:

forming a solution comprising at least one esterification agent, at least one catalyst and a metal oxide and/or organo-metal oxide composition;

allowing the esterification agent to react with the surface of the metal oxide and/or organo-metal oxide composition in the presence of the catalyst to esterify at least a portion of the surface of the metal oxide and/or organo-metal oxide composition; and drying the resulting metal oxide and/or organo-metal oxide composition.

A schematic diagram of an embodiment of a process for producing surface modified metal oxide and/or organo-metal oxide compositions according to the present invention is depicted in FIG. 1. As shown in FIG. 1, a metal oxide and/or organo-metal oxide composition is contacted with at least one esterification agent and at least one catalyst. The esterfication agent and catalyst may be precombined in an esterification solution as shown by the solid lines in FIG. 1, and the metal oxide and/or organo-metal oxide composition added to the solution. Alternatively, the esterification agent and/or catalyst may be added directly to a solution comprising the metal oxide and/or organo-metal oxide composition as shown by the dashed lines in FIG. 1.

The metal oxide and/or organo-metal oxide composition to be modified may be contacted by the esterification solution by adding metal oxide and/or organo-metal oxide composition solids to the esterification solution. Alternatively, a solution may be formed by combining the metal oxide and/or organo-metal oxide composition and a solvent and the esterification agent and catalyst added to the solution. Suitable solvents for this purpose include the solvents set forth above with reference to the esterification solution.

The process of the present invention may also be performed, where possible, by combining a metal oxide and/or organo-metal oxide composition and either the esterification agent, or the catalyst, and then adding the remaining component (catalyst or esterification agent) to the solution.

The esterification agent and the catalyst are allowed to remain in contact with the metal oxide and/or organo-metal oxide composition, under the temperature and/or pressure conditions specified, for a period of time sufficient to esterify at least a portion of the surface of the metal oxide and/or organo-metal oxide composition. Preferably, the esterification reaction is allowed to proceed until at least 25% of the surface, more preferably at least 35% of the surface, even more preferably at least 80% of the surface is esterified (includes ester groups).

After esterfication has been completed to the extent desired, the surface modified metal oxide and/or organo-metal oxide composition may be dried utilizing conventional techniques. For example, the surface modified metal oxide and/or organo-metal oxide composition may be dried at elevated temperatures in a flowing gas stream or vacuum.

Figure 2:
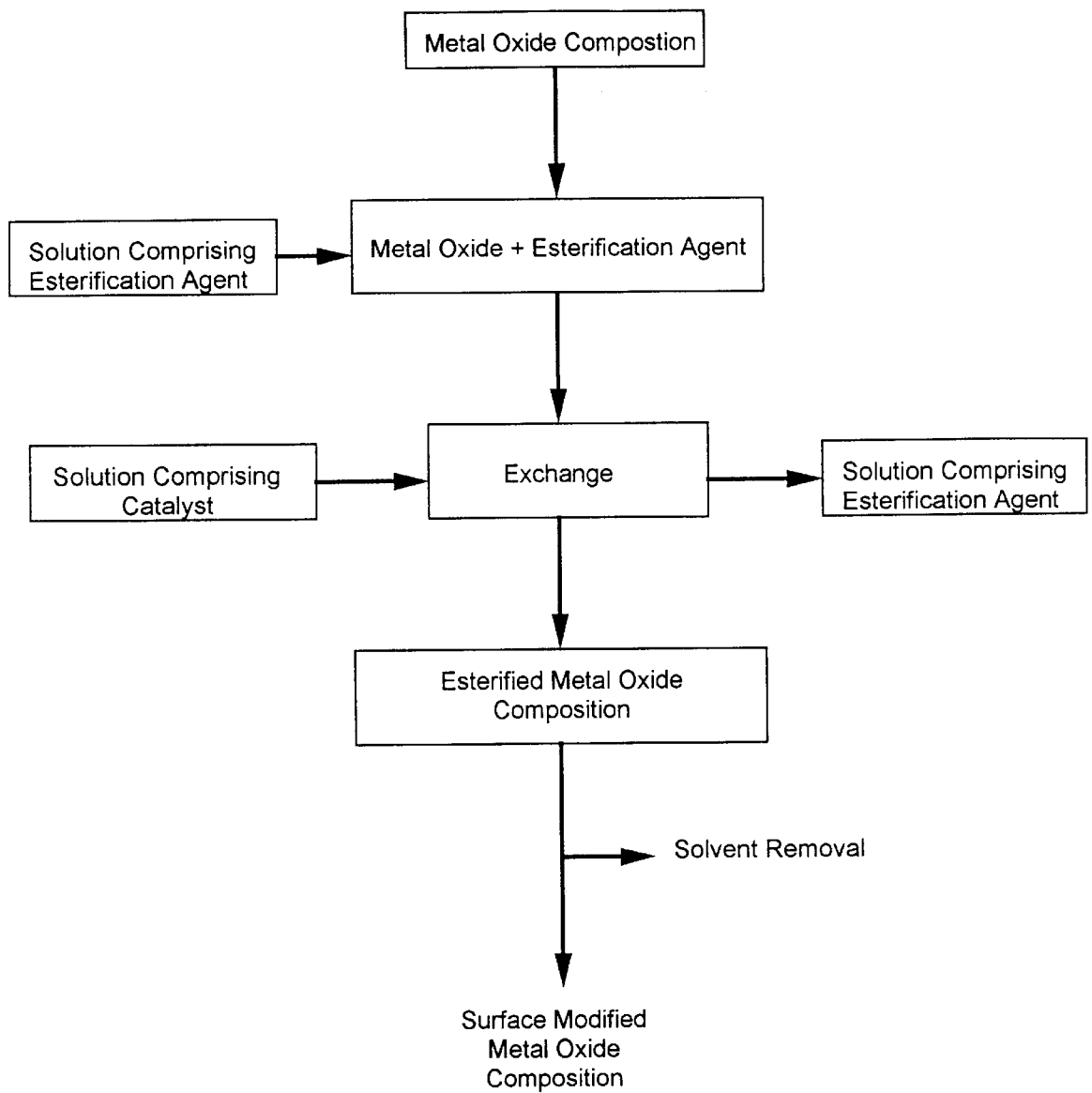
FIG. 2 is a schematic diagram of another embodiment of a process of the present invention.

An alternative embodiment of a process of the present invention is depicted schematically in FIG. 2. As shown in FIG. 2, a metal oxide and/or organo-metal oxide composition may be initially contacted with a solution comprising at least one esterification agent. The resulting solution comprising the metal oxide and/or organo-metal oxide and esterfication agent may then be contacted with a solution comprising the catalyst to catalyze the esterification reaction and produce a surface modified metal oxide and/or organo-metal oxide composition. Suitable reaction conditions, catalysts, and esterification agents include those set forth above. Preferably, the catalyzed esterification reaction is allowed to proceed until 25% of the surface, more preferably at least 35% of the surface, even more preferably at least 80% of the surface is esterified (includes ester groups). After esterfication has been completed to the extent desired, the surface modified metal oxide and/or organo-metal oxide composition may be dried utilizing conventional techniques. For example, the surface modified metal oxide and/or organo-metal oxide composition may be dried at elevated temperatures in a flowing gas stream or vacuum.

Figure 3:
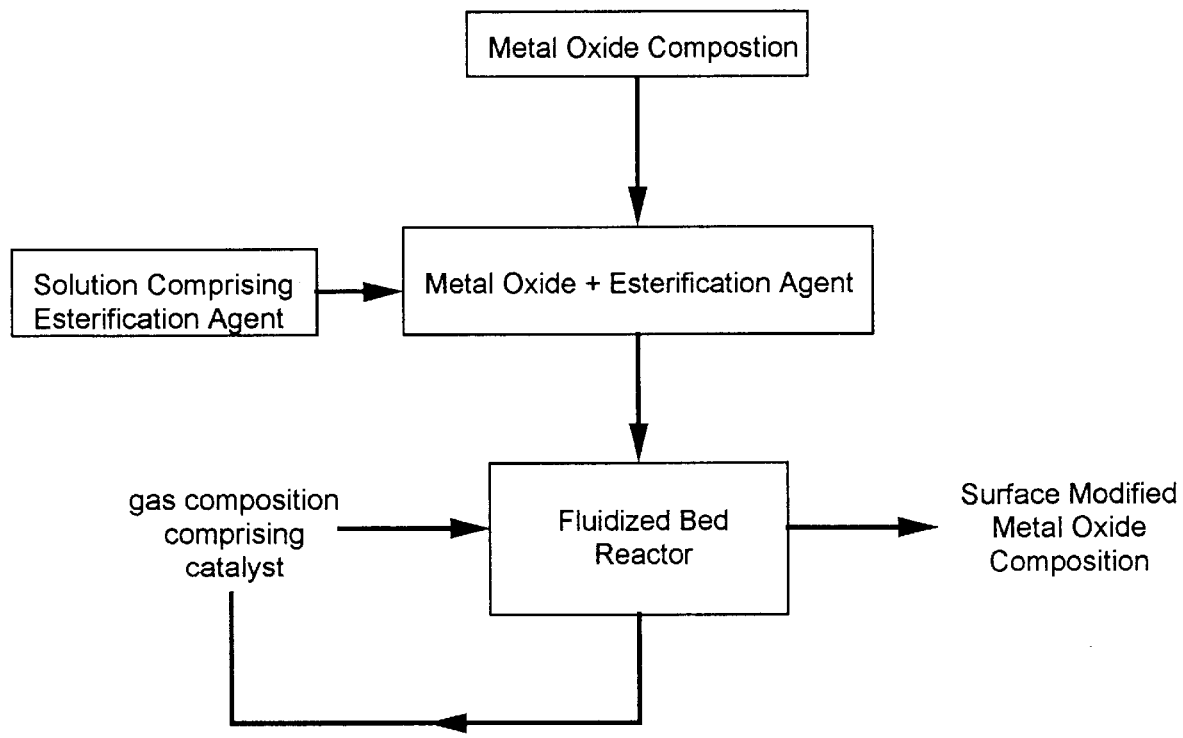
FIG. 3 is a schematic diagram of an alternative embodiment of a process of the present invention.

A further alternative embodiment of a process of the present invention is shown schematically in FIG. 3. As shown in FIG. 3, "wet" metal oxide and/or organo-metal oxide (comprising a organo-metal oxide composition and at least one esterification agent) may be placed in a fluidized bed reactor and contacted with a gas composition comprising carrier gas, preferably a dry inert carrier gas, and a liquid catalyst. The fluidization velocity will depend on the physical characteristics and volume of the wet metal oxide and/or organo-metal oxide but should be sufficient to maintain fluidization and enable the gas composition comprising the catalyst to flow through the metal oxide and/or organo-metal oxide to esterify at least a portion of the surface of the metal oxide and/or organo-metal oxide. The temperature of the gas may be approximately ambient temperature, e.g. 16–25° C.

A further alternative embodiment of a process of the present invention comprises placing "wet" metal oxide and/or organo-metal oxide (comprising a organo-metal oxide composition and at least one catalyst) in a fluidized bed reactor and contacting the wet metal oxide and/or organo-metal oxide with a gas composition comprising a carrier gas, preferably a dry carrier gas, and a liquid esterification agent. The fluidization velocity will depend on the physical characteristics and volume of the wet metal oxide and/or organo-metal oxide but should be sufficient to maintain fluidization and enable the gas composition comprising the esterification agent to flow through the metal oxide and/or organo-metal oxide to esterify at least a portion of the surface of the metal oxide and/or organo-metal oxide. The temperature of the gas may be approximately ambient temperature, e.g. 16–25° C.

As will be recognized by those of ordinary skill in the art, and understood from the description included herein, successful implementation of the processes of the present invention may be accomplished through a variety of different process pathways. In the case of a metal oxide and/or organo-metal oxide gel composition, the gel may be contacted with the esterification solution when the gel is in dry form, or the gel may be contacted during formation of the gel, prior to final drying. The steps involved in contacting the gel in dry form are similar to those described above. A detailed description of a process for producing gel compositions is set forth in our co-pending U.S. patent application Ser. No. 08/826,982 entitled "Process for Producing Low Density Gel Compositions", filed on the same day as the present application and incorporated herein by reference, wherein the surface of the gel is contacted prior to drying. In more detail, this process may comprise:

forming a gelation solution comprising a metal oxide and/or organo-metal oxide component;

initiating gelation in the solution to form a wet gel;

esterifying a portion of the surface of the wet gel composition through contact with at least one esterification agent in the presence of at least one catalyst; and drying the wet gel to produce a surface modified metal oxide and/or organo-metal oxide gel composition.

This process may further include one or more of the following steps:

washing the wet gel prior to esterifying;

aging the wet gel prior to esterifying;

aging the gel during contact with the esterification agent in the presence of at least one catalyst; or exchanging (replacing) the fluid in the wet get after esterification with a different fluid (e.g. a solvent) prior to drying.

Alternatively, metal oxide and/or organo-metal oxide gel composition solids may be added to the esterification solution, or combined with a solvent in a solution to which the esterification agent and catalyst are added in the manner described above with reference to other metal oxide and/or organo-metal oxide compositions.

As set forth above, in another embodiment, the process of the present invention comprises sequentially contacting the surface of a metal oxide and/or organo-metal oxide with at least one esterification agent and at least one catalyst wherein the esterification agent and the catalyst are in the liquid phase. In this embodiment, the surface of the metal oxide and/or organo-metal oxide may first be contacted with a solution comprising the esterification agent or the catalyst. Suitable esterification agents and catalysts and solutions include those discussed above. The surface of the metal oxide and/or organo-metal oxide is then contacted with the other remaining agent (esterification agent or catalyst) through adding the remaining agent to the solution comprising the first agent, or by replacing the solution comprising the first agent with a solution comprising the second agent. The process conditions, and desired outcome of this embodiment are the similar to those described above with reference to a first embodiment of a process of the present invention.

In more detail, an embodiment of a process of the present invention for producing surface modified metal oxide and/or organo-metal oxide compositions may comprise:

contacting the surface of a metal oxide and/or organo-metal oxide composition with a solution comprising at least one esterification agent;

then contacting the surface of the metal oxide and/or organo-metal oxide composition with a solution comprising at least one catalyst; and drying the resulting metal oxide and/or organo-metal oxide composition, wherein the contact between the surface of the metal oxide and/or organo-metal oxide and the esterification agent, and the contact between the surface of the metal oxide and/or organo-metal oxide and the catalyst is suffient to esterify at least a portion of the surface of the metal oxide and/or organo-metal oxide composition.

Alternatively, a process of the present invention for producing surface modified metal oxide and/or organo-metal oxide compositions may comprise:

contacting the surface of a metal oxide and/or organo-metal oxide composition with a solution comprising at least one catalyst;

then contacting the surface of the metal oxide and/or organo-metal oxide composition with a solution comprising at least one esterification agent; and drying the resulting metal oxide and/or organo-metal oxide composition, wherein the contact between the surface of the metal oxide and/or organo-metal oxide and the esterification agent, and the contact between the surface of the metal oxide and/or organo-metal oxide and the catalyst is suffient to esterify at least a portion of the surface of the metal oxide and/or organo-metal oxide composition.

In the case of a metal oxide and/or organo-metal oxide gel composition, the gel may be sequentially contacted with the esterification solution and catalyst solution during formation of the gel, prior to final drying. In more detail, this process may comprise:

forming a gelation solution comprising a metal oxide and/or organo-metal oxide component;

initiating gelation in the solution to form a wet gel;

contacting the surface of the wet gel composition with at least one esterification agent;

then contacting the surface of the wet gel composition with at least one catalyst; and drying the wet gel to produce a surface modified metal oxide and/or organo-metal oxide gel composition, wherein the contact between the surface of the wet gel composition and the esterification agent, and the contact between the surface of the wet gel composition and the catalyst is suffient to esterify at least a portion of the surface of the metal oxide and/or organo-metal oxide composition.

An alternative process may comprise:

forming a gelation solution comprising a metal oxide and/or organo-metal oxide component;

initiating gelation in the solution to form a wet gel;

contacting the surface of the wet gel composition with at least one catalyst;

then contacting the surface of the wet gel composition with at least one esterification agent; and drying the wet gel to produce a surface modified metal oxide and/or organo-metal oxide gel composition, wherein the contact between the surface of the wet gel composition and the esterification agent, and the contact between the surface of the wet gel composition and the catalyst is suffient to esterify at least a portion of the surface of the metal oxide and/or organo-metal oxide composition.

These gel processes may further include the additional steps outlined above.

Preferred products of the process of the present invention include surface modified metal oxide and organo-metal oxide compositions which may be utilized for applications such as thermal and acoustic insulation; catalyst supports and carriers; filters and molecular sieves; rheology control agents; reinforcing agents; thickeners and electronics; adsorbents; flatting agents; particulate additives; membranes; filters; radiation detectors; coatings; and dielectrics and other applications set forth herein and/or known to those of ordinary skill in the art.

The features and advantages of the processes of the present invention are further described in the following Examples wherein the following analytical procedures were utilized.

The surface area of the compositions may be determined utilizing ASTM test procedure D 1993

Gravimetric Analysis

Gravimetric analysis of the gel compositions described in the Examples was performed in a Dupont Model 951 TGA (thermogravimetric analyzer), manufactured by E.I. duPont E. Nemours Company, Wilmington, Del. The analysis was performed on a 10–20 milligram sample at a rate of 10° C. per minute in an air flow of approximately 50 cc/min, from an ambient starting temperature (approx. 20° C.) to 600° C.

The thermal gravimetric analysis is intended to illustrate the presence of ester groups on the surface of the gel and thereby that an esterification reaction has taken place. In this regard, a gel composition without ester groups, or with a minimal number of ester groups, will show a small weight broad weight loss over the temperature range at which the thermal gravimetric analysis is performed due to decomposition of the surface hydroxyl groups (—OH). In contrast, a gel composition in which a significant portion of the surface comprises ester groups will show a sharp decomposition (in terms of weight loss) within a small temperature range, at the temperatures at which the thermal gravimetric analysis is performed.

Extent of Esterification

The percentage of the surface of a composition which is esterified may be determined by calculating the theoretical maximum number of ester groups per square nanometer ($nm^2$) which may be packed onto the surface of a composition and then dividing the number of ester groups found on the surface, as determined by the procedure set forth below, by the theoretical maximum number of ester groups per $nm^2$ as follows:

$$\% \text{ esterification} = \frac{\text{\# of ester groups per nm}^2}{\text{theoretical maximum \# of ester groups per nm}^2} \times 100\%$$

The theoretical maximum # of ester groups per square nanometer which may be added to the surface of a composition is limited by the smaller of two factors: the number of (—OH) groups per unit area or the maximum number of ester groups which may be packed on the surface. The maximum number of ester groups which may be packed due to steric hinderance is related to the size of the groups and how they arrange on the surface. Assuming that the ester groups are spherical, pack with the six nearest neighbors on the surface and that the packing efficiency is not affected by the (—OH) surface distribution, the theoretical maximum number of ester groups per square nanometer may be calculated from the following formula:

theoretical max. number of ester groups per $nm^2 = 10^{-14}/\{1.091 [MW/(\rho_{liq} \times 6.023 \times 10^{23})]^{2/3}\}$ where MW=molecular weight of the esterification agent, and $\rho_{liq}$=liquid density of the esterification agent Using this formula the theoretical maximum number of ester groups # per $nm^2$ are as indicated for the following possible esterification agents:

methanol=5.5 $\#/nm^2$; ethanol=4.3 $\#/nm^2$; n-butanol=3.2 $\#/nm^2$; n-hexanol=2.6 $\#/nm^2$; t-butanol=3.2 $\#/nm^2$; n-octanol=2.2 $\#/nm^2$; allyl alcohol=3.9 $\#/nm^2$; phenol= 3.3 $\#/nm^2$; ethylene glycol=4.5 $\#/nm^2$; 1,2 propylene glycol=4.1 $\#/nm^2$; trifluoroethanol=4.1 $\#/nm^2$; monoethanol amine (MEA)=4.2 $\#/nm^2$; 2-methoxyethylamine (2-MEA)=3.3 $\#/nm^2$; dimethylbutylamine (DMBA)=2.4 $\#/nm^2$; dimethylethanolamine (DMEA)=3.0 $\#/nm^2$; diethanolamine (DEA)=3.1 $\#/nm^2$; triethylenediamine (DABCO)=3.0 $\#/nm^2$; and piperidine=3.1 $\#/nm^2$.

Number of Surface Ester Groups

The number of surface ester groups per square nanometer on the surface of a surface modified metal oxide composition may be calculated from the surface area of the metal oxide composition and the TGA weight loss data which indicates the molecular weight of the surface ester species. The number of surface ester groups per square nanometer is calculated utilizing the following formula:

$$\#/nm^2 = [6.023 \times 10^{23} \times W]/[(100-W) \times MW \times SA \times 10^{18}]$$

where
 W=percent weight loss by thermogravimetric analysis
 SA=surface area in $m^2/g$, and
 MW=molecular weight of the ester group.

Hydrophobicity

A determination of whether a composition was hydrophobic was made utilizing the following technique.

Approximately 50 milliliters of deionized water was placed in a beaker at ambient temperature. Granules of the sample (powder or gel) to be tested were placed on the surface of the water. If the granules remained floating for more than 10 minutes, the sample was judged to be hydrophobic.

Porosity and Rod Density

The porosity of a gel compositions may be determined by determining the rod density of the composition and calculating the porosity by the following method.

To determine rod density (the density of a single piece of gel), the gels were cast and formed in cylindrical molds. The total gel volume was determined by physically measuring the dimensions of a dry gel. The rod density was determined by weighing the dry gel and dividing by the geometric volume. In instances where a rod like geometry was not maintained or, as a verification of the above method, mercury displacement was employed. As will be understood by those of ordinary skill in the art, a mercury displacement technique may not entirely fill all of the pores in the gel and therefore result is a slightly lower than actual density calculation.

The rod density of gel compositions measured by mercury displacement was carried out as follows. A clean empty glass cell is filled with mercury to a specific height and the cell is weighed. The mercury is then removed and the cell is cleaned again. Next, a dry gel sample of known weight is placed in the glass cell and mercury is added to the cell to the same specific height as before. The weight of the cell containing mercury and the sample is measured. The weight of mercury in both cases is then converted to a volume based on the density of mercury. The difference between the volume of mercury which fills an empty cell and the volume of mercury which fills the cell containing a sample is known as the displaced volume after subtracting the weight of the sample. Since mercury does not wet the sample this volume is equal to the total volume of the sample. The density is then determined by dividing the weight of the sample by the displaced volume.

Porosity is defined as the fraction of the sample volume that is pores, both in and around the particulate material and may be determined by the following formula:

$$\text{Porosity} = 1 - \frac{\text{(measured rod density in porous form)}}{\text{(density of the material in solid form)}}$$

(in the case of a silica gel => $\epsilon = 1 - \rho_{rod}/\rho_{SiO2}$)

The density of a solid mass of the material is determined with reference to the composition of the material. In the case of a silica gel composition, without opacifying agents, the density of the solid mass of material is assumed to be the density of a solid mass of silica which is 2.2 g/cc (220 kg/m3). In the case of a gel composition which includes opacifying agents, the density of the solid mass of material is assumed to be a weighted average of the densities of each component. For example, in the case of a gel composition comprising a silica gel precursor and a carbon black opacifying agent, the density of the solid mass of material is assumed to be a weighted average of the density of a solid mass of silica (2.2 g/cc) and the density of a solid mass of carbon black (1.8 g/cc).

The following examples illustrate the features and advantages of the processes of the present invention in comparison to other processes. Examples of the processes of the present invention are set forth as "Examples", examples of other processes are set forth as "Comparative Examples".

The powdered metal oxide and/or organo-metal oxide composition utilized in Examples 1–29 was Cab—O—Sil EH-5 fumed silica having a surface area of 380 $m^2/g$ manufactured and sold by Cabot Corporation, Aurora, Ill.

EXAMPLES 1–29

Surface Modification of Powdered Metal Oxide Composition

Examples 1–4 are comparative examples of processes in which a powdered metal oxide and/or organo-metal oxide composition was contacted by at least one esterification agent with no catalyst present.

Comparitive Example 1

This example illustrates a process wherein a powdered metal oxide and/or organo-metal oxide composition is contacted by methanol, as at least one esterification agent, without the presence of at least one catalyst.

1.0 g of fumed silica (Cabot EH5) was placed in an oven at 140° C. for 4–6 hours to removed physically bound water. The dried fumed silica was then dispersed in 49 g of 200 proof ethanol, (manufactured and sold by Quantum Chemical) which had been pretreated with zeolite 3A to remove trace amounts of water. After mixing the solution was sealed and placed in an oven at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

Comparative Example 2

This example illustrates a process wherein a powdered metal oxide and/or organo-metal oxide composition is contacted by n-butanol, as at least one esterification agent, without the presence of at least one catalyst.

1.0 g of fumed silica (Cabot EH5) was placed in an oven at 140° C. for 4–6 hours to removed physically bound water. The dried silica was then dispersed in 49 g of n-butanol which had been pretreated with zeolite 3A to remove trace amounts of water. After mixing the solution was sealed and placed in an oven at 65° C. for 15 hours.

After removal from the oven the sample was opened to the atmosphere and dried back into a powder at 125° C. The sample was subjected to Thermal Gravimetric Analysis and hydrophobicity analysis utilizing the procedures described above. The results, and the calculated number of surface ester groups per square nanometer, are reported in Table 1 below.

Comparative Example 3

This example illustrates a process wherein a powdered metal oxide and/or organo-metal oxide composition is contacted by t-butanol (tert-butanol), as at least one esterification agent, without the presence of at least one catalyst.

1.0 g of fumed silica (Cabot EH5) was placed in an oven at 140° C. for 4–6 hours to removed physically bound water. The dried silica was then dispersed in 49 g of tert-butanol which had been pretreated with zeolite 3A to remove trace amounts of water. After mixing the solution was sealed and placed in an oven at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

Comparative Example 4

This example illustrates a process wherein a powdered metal oxide and/or organo-metal oxide composition is contacted by n-hexanol, as at least one esterification agent, without the presence of at least one catalyst.

1.0 g of fumed silica (Cabot EH5) was placed in an oven at 140° C. for 4–6 hours to removed physically bound water. The dried silica was then dispersed in 49 g of n-hexanol which had been pretreated with zeolite 3A to remove trace amounts of water. After mixing the solution was sealed and placed in an oven at 65° C. for 15 hours.

After removal from the oven the sample was opened to the atmosphere and dried back into a powder at 170° C. The sample was subjected to Thermal Gravimetric Analysis and hydrophobicity analysis utilizing the procedures described above. The results, and the calculated number of surface ester groups per square nanometer, are reported in Table 1 below.

Examples 5–7 are examples of processes in which a powdered metal oxide and/or organo-metal oxide composition was contacted by an agent which will function as both at least one esterification agent and at least one catalyst.

EXAMPLE 5

This example illustrates a process for esterifying a powdered metal oxide and/or organo-metal oxide composition utilizing MEA (monoethanol amine) as at least one catalyst and esterification agent.

1.0 g of fumed silica (Cabot EH5) was placed in an oven at 140° C. for 4–hours to removed physically bound water. The dried silica was then dispersed in 49 g of monoethanolamine (MEA) (supplied by Aldrich Chemical Co.) which had been pretreated with zeolite 3A to remove trace amounts of water. After mixing the solution was sealed and placed in an oven at 65° C. for 15 hours.

After removal from the oven the sample was opened to the atmosphere and dried back into a powder at 180° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 6

This example illustrates a process for esterifying a powdered metal oxide and/or organo-metal oxide composition utilizing 2-MEA (2-methoxyethylamine) as at least one catalyst and esterification agent.

1.0 g of fumed silica (Cabot EH5) was placed in an oven at 140° C. for 4–6 hours to removed physically bound water. The dried silica was then dispersed in 49 g of 2methoxyethylamine (2-MEA) (supplied by Aldrich Chemical Co.) which had been pretreated with zeolite 3A to remove trace amounts of water. After mixing the solution was sealed and placed in an oven at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 7

This example illustrates a process for esterifying a powdered metal oxide and/or organo-metal oxide composition utilizing DMBA (dimethylbutylamine) as at least one catalyst and esterification agent.

1.0 g of fumed silica (Cabot EH5) was placed in an oven at 140° C. for 4–6 hours to removed physically bound water. The dried silica was then dispersed in 49 g of dimethylbutylamine (DMBA) (supplied by Aldrich Chemical Co.) which had been pretreated with zeolite 3A to remove trace amounts of water. After mixing the solution was sealed and placed in an oven at 65° C. for 15 hours.

After removal from the oven the sample was opened to the atmosphere and dried back into a powder at 125° C. The sample was subjected to Thermal Gravimetric Analysis and hydrophobicity analysis utilizing the procedures described above. The results, and the calculated number of surface ester groups per square nanometer, are reported in Table 1 below.

Examples 8–29 are examples of processes in which a powdered metal oxide and/or organo-metal oxide composition was contacted by at least one esterification agent and at least one catalyst.

EXAMPLE 8

This example illustrates a process for esterifying a powdered metal oxide and/or organo-metal oxide composition utilizing MEA (monoethanolamine) as at least one catalyst and methanol as at least one esterification agent.

1.0 g of fumed silica (Cabot EH5) was placed in an oven at 140° C. for 4–6 hours to removed physically bound water.

A solution comprising the catalyst and the esterification agent was created by dispersing Monoethanolamine (MEA) (supplied by Aldrich Chemical Co.) in 49 g of methanol which had been pretreated with zeolite 3A to remove trace amounts of water. The amount of catalyst added was determined on a silica weight basis so that the amount of catalyst equaled 1.5% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 9

This example illustrates a process for esterifying a powdered metal oxide and/or organo-metal oxide composition utilizing MEA (monoethanolamine) as at least one catalyst and ethanol as at least one esterification agent.

1.0 g of fumed silica (Cabot EH5) was placed in an oven at 140° C. for 4–6 hours to removed physically bound water.

A solution comprising the catalyst and the esterification agent was created by dispersing Monoethanolamine (MEA) (supplied by Aldrich Chemical Co.) in 49 g of 200 proof ethanol (supplied by Quantum Chemical) which had been pretreated with zeolite 3A to remove trace amounts of water. The amount of catalyst added was determined on a silica weight basis so that the amount of catalyst equaled 1.5% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 10

This example illustrates a process for esterifying a powdered metal oxide and/or organo-metal oxide composition utilizing 2-MEA (2-methoxyethylamine) as at least one catalyst and ethanol as at least one esterification agent.

1.0 g of fumed silica (Cabot EH5) was placed in an oven at 140° C. for 4–6 hours to removed physically bound water.

A solution comprising the catalyst and the esterification agent was created by dispersing 2-methoxyethylamine (2-MEA) (supplied by Aldrich Chemical Co. Chemical Co.) in 49 g of 200 proof ethanol (supplied by Quantum Chemical) which had been pretreated with zeolite 3A to remove trace amounts of water. The amount of catalyst added was determined on a silica weight basis so that the amount of catalyst equaled 1.8% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 11

This example illustrates a process for esterifying a powdered metal oxide and/or organo-metal oxide composition utilizing MEA (monoethanolamine) as at least one catalyst and n-propanol as at least one esterification agent.

1.0 g of fumed silica (Cabot EH5) was placed in an oven at 140° C. for 4–6 hours to removed physically bound water.

A solution comprising the catalyst and the esterification agent was created by dispersing Monoethanolamine (MEA) (supplied by Aldrich Chemical Co.) in 49 g of n-propanol which had been pretreated with zeolite 3A to remove trace amounts of water. The amount of catalyst added was determined on a silica weight basis so that the amount of catalyst equaled 1.5% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 12

This example illustrates a process for esterifying a powdered metal oxide and/or organo-metal oxide composition utilizing MEA (monoethanolamine) as at least one catalyst and n-butanol as at least one esterification agent.

1.0 g of fumed silica (Cabot EH5) was placed in an oven at 140° C. for 4–6 hours to removed physically bound water.

A solution comprising the catalyst and the esterification agent was created by dispersing Monoethanolamine (MEA) (supplied by Aldrich Chemical Co.) in 49 g of n-butanol which had been pretreated with zeolite 3A to remove trace amounts of water. The amount of catalyst added was determined on a silica weight basis so that the amount of catalyst equaled 1.5% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

Comparative Example 13

This example illustrates a process for esterifying a powdered metal oxide and/or organo-metal oxide composition utilizing MEA (monoethanolamine) as at least one catalyst and t-butanol as at least one esterification agent.

1.0 g of fumed silica (Cabot EH5) was placed in an oven at 140° C. for 4–6 hours to removed physically bound water.

A solution comprising the catalyst and the esterification agent was created by dispersing Monoethanolamine (MEA) (supplied by Aldrich Chemical Co.) in 49 g of t-butanol which had been pretreated with zeolite 3A to remove trace amounts of water. The amount of catalyst added was determined on a silica weight basis so that the amount of catalyst equaled 1.5% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 14

This example illustrates a process for esterifying a powdered metal oxide and/or organo-metal oxide composition utilizing MEA (monoethanolamine) as at least one catalyst and t-butanol and n-butanol as esterification agents.

1.0 g of fumed silica (Cabot EH5) was placed in an oven at 140° C. for 4–6 hours to removed physically bound water.

A solution comprising the catalyst and the esterification agent was created by dispersing Monoethanolamine (MEA) (supplied by Aldrich Chemical Co.) in a mixture of 24.5 g of t-butanol and 24.5 g of n-butanol which had each been pretreated with zeolite 3A to remove trace amounts of water. The amount of catalyst added was determined on a silica weight basis so that the amount of catalyst equaled 1.5% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 15

This example illustrates a process for esterifying a powdered metal oxide and/or organo-metal oxide composition utilizing 2-MEA (2-methoxyethylamine) as at least one catalyst and n-butanol as at least one esterification agent 1.0 g of fumed silica (Cabot EH5) was placed in an oven at 140° C. for 4–6 hours to removed physically bound water.

A solution comprising the catalyst and the esterification agent was created by dispersing 2-MEA (supplied by Aldrich Chemical Co.) in 49 g of n-butanol which had been pretreated with zeolite 3A to remove trace amounts of water. The amount of catalyst added was determined on a silica weight basis so that the amount of catalyst equaled 1.8% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 16

This example illustrates a process for esterifying a powdered metal oxide and/or organo-metal oxide composition utilizing DMBA (dimethylbutylamine) as at least one catalyst and n-butanol as at least one esterification agent.

1.0 g of fumed silica (Cabot EH5) was placed in an oven at 140° C. for 4–6 hours to removed physically bound water.

A solution comprising the catalyst and the esterification agent was created by dispersing Dimethylbutylamine (DMBA) (supplied by Aldrich Chemical Co.) in 49 g of n-butanol which had been pretreated with zeolite 3A to remove trace amounts of water. The amount of catalyst added was determined on a silica weight basis so that the amount of catalyst equaled 2.4% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 17

This example illustrates a process for esterifying a powdered metal oxide and/or organo-metal oxide composition utilizing DMEA (dimethylethanolamine) as at least one catalyst and n-butanol as at least one esterification agent.

1.0 g of fumed silica (Cabot EH5) was placed in an oven at 140° C. for 4–6 hours to removed physically bound water.

A solution comprising the catalyst and the esterification agent was created by dispersing Dimethylethanolamine (DMEA) (supplied by Aldrich Chemical Co.) in 49 g of n-butanol which had been pretreated with zeolite 3A to remove trace amounts of water. The amount of catalyst added was determined on a silica weight basis so that the amount of catalyst equaled 2.1% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 18

This example illustrates a process for esterifying a powdered metal oxide and/or organo-metal oxide composition utilizing DEA (diethanolamine) as at least one catalyst and n-butanol as at least one esterification agent.

1.0 g of fumed silica (Cabot EH5) was placed in an oven at 140° C. for 4–6 hours to removed physically bound water.

A solution comprising the catalyst and the esterification agent was created by dispersing Diethanolamine (DEA) (supplied by Aldrich Chemical Co.) in 49 g of n-butanol which had been pretreated with zeolite 3A to remove trace amounts of water. The amount of catalyst added was determined on a silica weight basis so that the amount of catalyst equaled 2.5% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 19

This example illustrates a process for esterifying a powdered metal oxide and/or organo-metal oxide composition utilizing DABCO (triethylenediamine) as at least one catalyst and n-butanol as at least one esterification agent.

1.0 g of fumed silica (Cabot EH5) was placed in an oven at 140° C. for 4–6 hours to removed physically bound water.

A solution comprising the catalyst and the esterification agent was created by dispersing Triethylenediamine (DABCO) (supplied by Aldrich Chemical Co.) in 49 g of n-butanol which had been pretreated with zeolite 3A to remove trace amounts of water. The amount of catalyst added was determined on a silica weight basis so that the amount of catalyst equaled 2.7% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 20

This example illustrates a process for esterifying a powdered metal oxide and/or organo-metal oxide composition utilizing piperdine as at least one catalyst and n-butanol as at least one esterification agent.

1.0 g of fumed silica (Cabot EH5) was placed in an oven at 140° C. for 4–6 hours to removed physically bound water.

A solution comprising the catalyst and the esterification agent was created by dispersing piperdine (supplied by Aldrich Chemical Co.) in 49 g of n-butanol which had been pretreated with zeolite 3A to remove trace amounts of water. The amount of catalyst added was determined on a silica weight basis so that the amount of catalyst equaled 2.0% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 21

This example illustrates a process for esterifying a powdered metal oxide and/or organo-metal oxide composition utilizing MEA (monoethanolamine) as at least one catalyst and n-hexanol as at least one esterification agent.

1.0 g of fumed silica (Cabot EH5) was placed in an oven at 140° C. for 4–6 hours to removed physically bound water.

A solution comprising the catalyst and the esterification agent was created by dispersing MEA (supplied by Aldrich Chemical Co.) in 49 g of n-hexanol which had been pretreated with zeolite 3A to remove trace amounts of water. The amount of catalyst added was determined on a silica weight basis so that the amount of catalyst equaled 1.5% by weight of the silica The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 22

This example illustrates a process for esterifying a powdered metal oxide and/or organo-metal oxide composition utilizing 2-MEA (2-methoxyethylamine) as at least one catalyst and n-hexanol as at least one esterification agent 1.0 g of fumed silica (Cabot EH5) was placed in an oven at 140° C. for 4–6 hours to removed physically bound water.

A solution comprising the catalyst and the esterification agent was created by dispersing 2-MEA (supplied by Aldrich Chemical Co.) in 49 g of n-hexanol which had been pretreated with zeolite 3A to remove trace amounts of water. The amount of catalyst added was determined on a silica weight basis so that the amount of catalyst equaled 1.8% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 23

This example illustrates a process for esterifying a powdered metal oxide and/or organo-metal oxide composition utilizing DEA (diethanolamine) as at least one catalyst and n-hexanol as at least one esterification agent.

1.0 g of fumed silica (Cabot EH5) was placed in an oven at 140° C. for 4–6 hours to removed physically bound water.

A solution comprising the catalyst and the esterification agent was created by dispersing DEA (supplied by Aldrich Chemical Co.) in 49 g of n-hexanol which had been pretreated with zeolite 3A to remove trace amounts of water. The amount of catalyst added was determined on a silica weight basis so that the amount of catalyst equaled 2.5% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 24

This example illustrates a process for esterifying a powdered metal oxide and/or organo-metal oxide composition utilizing 2-MEA (2-methoxyethylamine) as at least one catalyst and allyl alcohol as at least one esterification agent.

1.0 g of fumed silica (Cabot EH5) was placed in an oven at 140° C. for 4–6 hours to removed physically bound water.

A solution comprising the catalyst and the esterification agent was created by dispersing 2-MEA (supplied by Aldrich Chemical Co.) in 49 g of allyl alcohol which had been pretreated with zeolite 3A to remove trace amounts of water. The amount of catalyst added was determined on a silica weight basis so that the amount of catalyst equaled 1.8% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 25

This example illustrates a process for esterifying a powdered metal oxide and/or organo-metal oxide composition utilizing MEA (monoethanolamine) as at least one catalyst and n-octanol as at least one esterification agent.

1.0 g of fumed silica (Cabot EH5) was placed in an oven at 140° C. for 4–6 hours to removed physically bound water.

A solution comprising the catalyst and the esterification agent was created by dispersing MEA (supplied by Aldrich Chemical Co.) in 49 g of n-octanol which had been pretreated with zeolite 3A to remove trace amounts of water. The amount of catalyst added was determined on a silica weight basis so that the amount of catalyst equaled 1.5% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 26

This example illustrates a process for esterifying a powdered metal oxide and/or organo-metal oxide composition utilizing 2-MEA (2-methoxyethylamine) as at least one catalyst and ethylene glycol as at least one esterification agent.

1.0 g of fumed silica (Cabot EH5) was placed in an oven at 140° C. for 4–6 hours to removed physically bound water.

A solution comprising the catalyst and the esterification agent was created by dispersing 2-MEA (supplied by Aldrich Chemical Co.) in 49 g of ethylene glycol which had been pretreated with zeolite 3A to remove trace amounts of water. The amount of catalyst added was determined on a silica weight basis so that the amount of catalyst equaled 1.8% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 27

This example illustrates a process for esterifying a powdered metal oxide and/or organo-metal oxide composition utilizing 2-MEA (2-methoxyethylamine) as at least one catalyst and 1,2 propylene glycol as at least one esterification agent.

1.0 g of fumed silica (Cabot EH5) was placed in an oven at 140° C. for 4–6 hours to removed physically bound water.

A solution comprising the catalyst and the esterification agent was created by dispersing 2-MEA (supplied by Aldrich Chemical Co.) in 49 g of 1,2 propylene glycol which had been pretreated with zeolite 3A to remove trace amounts of water. The amount of catalyst added was determined on a silica weight basis so that the amount of catalyst equaled 1.8% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 28

This example illustrates a process for esterifying a powdered metal oxide and/or organo-metal oxide composition utilizing 2-MEA (2-methoxyethylamine) as at least one catalyst and trifluroethanol as at least one esterification agent. 1.0 g of fumed silica (Cabot EH5) was placed in an oven at 140° C. for 4–6 hours to removed physically bound water.

A solution comprising the catalyst and the esterification agent was created by dispersing 2-MEA (supplied by Aldrich Chemical Co.) in 49 g of trifluoroethanol which had been pretreated with zeolite 3A to remove trace amounts of water. The amount of catalyst added was determined on a silica weight basis so that the amount of catalyst equaled 1.8% by weight of the silica.

The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 29

This example illustrates a process for esterifying a powdered metal oxide and/or organo-metal oxide composition utilizing 2-MEA (2-methoxyethylamine) as at least one catalyst and phenol as at least one esterification agent.

1.0 g of fumed silica (Cabot EH5) was placed in an oven at 140° C. for 4–6 hours to removed physically bound water.

A solution comprising the catalyst and the esterification agent was created by dispersing 2-MEA (supplied by Aldrich Chemical Co.) in 49 g of phenol which had been pretreated with zeolite 3A to remove trace amounts of water. The amount of catalyst added was determined on a silica weight basis so that the amount of catalyst equaled 1.8% by weight of the silica The 1.0 g of silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLES 30–34

Surface Modification of Powdered Metal Oxide Gel Composition

Examples 30–34 illustrate surface modification of a dried powdered metal oxide and/or organo-metal oxide gel composition. The gel composition utilized in examples 30–34 was a silica aerogel prepared utilizing a sol-gel process at ambient pressure which in this case was 12.2 psi, ambient pressure for Albuquerque, New Mexico.

A silica stock solution was prepared by mixing a sodium silicate having an $SiO_2/Na_2O$ molar ratio of 3.3:1, with deionized water in a volume ratio of water to sodium silicate such that the weight percent silica when neutralized with mineral acid was 10%. The sodium silicate was obtained from PQ Corporation, Valley Forge, Pa. and is available commercially.

A separate solution comprising 2M $H_2SO_4$ was prepared by diluting concentrated 98% sulfuric acid from J. T. Baker, Phillipsburg, N.J. with water. An aliquot of the sodium silicate stock solution was then slowly added to an appropriate amount of stirred 2M acid such that the resulting silica sol would have a pH of between approximately 1.3 and 2.0. The rate of silicate addition was kept constant at 1 milliliter/minute and the acid solution was maintained at 15° C. in a jacketed beaker.

Gelation was accomplished by continued addition of the sodium silicate solution until the pH of the sol reached 5.0. At this point the sol was vigorously stirred for 2–5 minutes and then cast into cylindrical tubes. Gelation occurred in 5 to 15 minutes and the tubes were sealed to prevent drying. The gels were allowed to age for 1–2 hours at 50° C. in the molds after which they were removed and placed in sealed tubes containing deionized water and kept at room temperature.

Fresh water was added every 5 hours for a total of 20 hours at which time it was determined, through the use of a sodium electrode, that the amount of sodium sulfate salt present in the gel was less than 100 parts per million (ppm).

The gels were then aged at 80° C. in deionized water for 1 hour.

After aging the gels were placed in sealed tubes with 200 proof ethanol and allowed to exchange pore fluid for 6 hours at 50° C. The ethanol was obtained from Quantum Chemical, Cincinnati, Ohio.

The ethanol exchange and aging was repeated until the residual water content of the gel reached approximately 0.2% by volume. When this point was reached, the ethanol was washed free from the gel with n-heptane through a series of exchanges over 6 hours at 50° C. The n-heptane was obtained from Interstate Chemical Company, Hermitage, Pa. After the ethanol was replaced with n-heptane, the gels were placed in a chamber and dried under a vacuum.

The resulting gel compositions had a rod density of 0.35 g/cc and a 2.1% broad weight loss at elevated temperatures due to decomposition of surface hydroxyl (—OH) groups, as seen in the thermal gravimetric analysis spectra, indicating substantially no esterification of the surface of the gel.

EXAMPLE 30

This example illustrates a process for esterifying a powdered metal oxide and/or organo-metal oxide gel composition utilizing 2-MEA (2-methoxyethylamine) as at least one catalyst and 1,2-propylene glycol as at least one esterification agent. 1.0 g of silica aerogel was placed in an oven at 140° C. for 4–6 hours to removed physically bound water.

A solution comprising the catalyst and the esterification agent was created by dispersing 2-MEA (supplied by Aldrich Chemical Co.) in 49 g of 1,2-propylene glycol which had been pretreated with zeolite 3A to remove trace amounts of water. The amount of catalyst added was determined on a silica weight basis so that the amount of catalyst equaled 3.75% by weight of the silica aerogel.

The 1.0 g of silica aerogel was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 31

This example illustrates a process for esterifying a powdered metal oxide and/or organo-metal oxide gel composition utilizing 2-MEA (2-methoxyethylamine) as at least one catalyst and trifluoroethanol as at least one esterification agent.

1.0 g of silica aerogel was placed in an oven at 140° C. for 4–6 hours to removed physically bound water.

A solution comprising the catalyst and the esterification agent was created by dispersing 2-MEA (supplied by Aldrich Chemical Co.) in 49 g of trifluoroethanol which had been pretreated with zeolite 3A to remove trace amounts of water. The amount of catalyst added was determined on a silica weight basis so that the amount of catalyst equaled 3.75% by weight of the silica aerogel.

The 1.0 g of silica aerogel was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 32

This example illustrates a process for esterifying a powdered metal oxide and/or organo-metal oxide gel composition utilizing 2-MEA (2-methoxyethylamine) as at least one catalyst and phenol as at least one esterification agent.

1.0 g of silica aerogel was placed in an oven at 140° C. for 4–6 hours to removed physically bound water.

A solution comprising the catalyst and the esterification agent was created by dispersing 2-MEA (supplied by Aldrich Chemical Co.) in 49 g of phenol which had been

27 pretreated with zeolite 3A to remove trace amounts of water. The amount of catalyst added was determined on a silica weight basis so that the amount of catalyst equaled 3.75% by weight of the silica aerogel.

The 1.0 g of silica aerogel was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 33

This example illustrates a process for esterifying a powdered metal oxide and/or organo-metal oxide gel composition utilizing 2-MEA (2-methoxyethylamine) as at least one catalyst and allyl alcohol as at least one esterification agent.

1.0 g of silica aerogel was placed in an oven at 140° C. for 4–6 hours to removed physically bound water.

A solution comprising the catalyst and the esterification agent was created by dispersing 2-MEA (supplied by Aldrich Chemical Co.) in 49 g of allyl alcohol which had been pretreated with zeolite 3A to remove trace amounts of water. The amount of catalyst added was determined on a silica weight basis so that the amount of catalyst equaled 3.75% by weight of the silica aerogel.

The 1.0 g of silica aerogel was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 34

This example illustrates a process for esterifying a powdered metal oxide and/or organo-metal oxide gel composition utilizing 2-MEA (2-methoxyethylamine) as at least one catalyst and allyl alcohol and n-butanol as esterification agents.

1.0 g of silica aerogel was placed in an oven at 140° C. for 4–6 hours to removed physically bound water.

A solution comprising the catalyst and the esterification agent was created by dispersing 2-MEA (supplied by Aldrich Chemical Co.) in 24.5 g of allyl alcohol and 24.5 g of n-butanol each of which had been pretreated with zeolite 3A to remove trace amounts of water. The amount of catalyst added was determined on a silica weight basis so that the amount of catalyst equaled 3.75% by weight of the silica aerogel.

The 1.0 g of silica aerogel was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

28

EXAMPLES 35–37

Surface Modification of Powdered Metal Oxide Compositions

Examples 35–37 illustrate processes for modifying the surface of precipitated silica, titania and alumina powdered metal oxide and/or organo-metal oxide compositions.

EXAMPLE 35

This example illustrates a process for esterifying a precipitated silica powdered metal oxide and/or organo-metal oxide composition utilizing 2-MEA (2methoxyethylamine) as at least one catalyst and n-butanol as at least one esterification agent.

1.0 g of commercially available Degussa FK500LS precipitated silica, manufactured and sold by Degussa, having a surface area of 560 $m^2$/g was placed in an oven at 140° C. for 4–6 hours to removed physically bound water.

A solution comprising the catalyst and the esterification agent was created by dispersing 2-MEA (supplied by Aldrich Chemical Co.) in 49 g of n-butanol which had been pretreated with zeolite 3A to remove trace amounts of water. The amount of catalyst added was determined on a silica weight basis so that the amount of catalyst equaled 0.33% by weight of the precipitated silica.

The 1.0 g of precipitated silica was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 36

This example illustrates a process for esterifying a titania powdered metal oxide and/or organo-metal oxide composition utilizing 2-MEA (2-methoxyethylamine) as at least one catalyst and n-butanol as at least one esterification agent. 1.0 g of commercially available P25 Titania, manufactured and sold by Degussa, was placed in an oven at 140° C. for 4–6 hours to removed physically bound water.

A solution comprising the catalyst and the esterification agent was created by dispersing 2-MEA (supplied by Aldrich Chemical Co.) in 49 g of n-butanol which had been pretreated with zeolite 3A to remove trace amounts of water. The amount of catalyst added was determined on a titania weight basis so that the amount of catalyst equaled 0.26% by weight of the titania.

The 1.0 g of titania was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLE 37

This example illustrates a process for esterifying an alumina powdered metal oxide and/or organo-metal oxide composition utilizing 2-MEA (2-methoxyethylamine) as at least one catalyst and n-butanol as at least one esterification agent.

1.0 g of commercially available DISPAL Alumina, manufactured and sold by Vista Chemical, now Condea-Vista of Houston, Texas was placed in an oven at 140° C. for 4–6 hours to removed physically bound water.

A solution comprising the catalyst and the esterification agent was created by dispersing 2-MEA (supplied by Aldrich Chemical Co.) in 49 g of n-butanol which had been pretreated with zeolite 3A to remove trace amounts of water. The amount of catalyst added was determined on an alumina weight basis so that the amount of catalyst equaled 0.05% by weight of the alumina.

The 1.0 g of alumina was dispersed in the catalyst/esterfication agent solution, sealed, and placed in an over at 65° C. for 15 hours.

After removal from the oven the sample was opened to the atmosphere and dried back into a powder at 100° C. The sample was subjected to Thermal Gravimetric Analysis and hydrophobicity analysis utilizing the procedures described above. The results, and the calculated number of surface ester groups per square nanometer, are reported in Table 1 below.

EXAMPLES 38–49

Surface Modification of a Wet Metal Oxide Gel Composition

Examples 38–49 illustrate processes wherein a metal oxide and/or organo-metal oxide gel composition is contacted with at least one esterification agent and/or at least one catalyst during the gel preparation process.

Example 38 illustrates a process wherein a metal oxide and/or organo-metal oxide composition is contacted with at least one esterification agent during the gel preparation process without the presence of at least one catalyst.

Comparative Example 38

This example illustrates a process wherein a wet gel composition is contacted at least one esterification agent, ethanol during preparation. This example also illustrates the production of a gel composition according to a sol-gel process at ambient pressure which in this case was 12.2 psi.

A silica stock solution was prepared by mixing a sodium silicate having an $SiO_2/Na_2O$ molar ratio of 3.3:1, with deionized water in a volume ratio of water to sodium silicate such that the weight percent silica when neutralized with mineral acid was 10%. The sodium silicate was obtained from PQ Corporation, Valley Forge, Pa. and is available commercially.

A separate solution comprising 2M $H_2SO_4$ was prepared by diluting concentrated 98% sulfuric acid from J. T. Baker, Phillipsburg, N.J. with water. An aliquot of the sodium silicate stock solution was then slowly added to an appropriate amount of stirred 2M acid such that the resulting silica sol would have a pH of between approximately 1.3 and 2.0. The rate of silicate addition was kept constant at 1 milliliter/minute and the acid solution was maintained at 15° C. in a jacketed beaker.

Gelation was accomplished by continued addition of the sodium silicate solution until the pH of the sol reached 5.0. At this point the sol was vigorously stirred for 2–5 minutes and then cast into cylindrical tubes. Gelation occurred in 5 to 15 minutes and the tubes were sealed to prevent drying.

The gels were allowed to age for 1–2 hours at 50° C. in the molds after which they were removed and placed in sealed tubes containing deionized water and kept at room temperature.

Fresh water was added every 5 hours for a total of 20 hours at which time it was determined, through the use of a sodium electrode, that the amount of sodium sulfate salt present in the gel was less than 100 parts per million (ppm).

The gels were then aged at 80° C. in deionized water for 1 hour.

After aging the gels were placed in sealed tubes with 200 proof ethanol and allowed to exchange pore fluid for 6 hours at 50° C. The ethanol was obtained from Quantum Chemical, Cincinnati, Ohio.

The ethanol exchange and aging was repeated until the residual water content of the gel reached approximately 0.2% by volume. When this point was reached, the ethanol was washed free from the gel with n-heptane through a series of exchanges over 6 hours at 50° C. The n-heptane was obtained from Interstate Chemical Company, Hermitage, Pa. After the ethanol was replaced with n-heptane, the gels were placed in a chamber and dried under a vacuum.

The sample was subjected to Thermal Gravimetric Analysis and hydrophobicity analysis utilizing the procedures described above. The results, and the calculated number of surface ester groups per square nanometer, are reported in Table 1 below.

Examples 39–49 illustrate processes wherein the surface of a metal oxide and/or organo-metal oxide gel composition is contacted with at least one esterification agent and at least one catalyst during preparation of the gel composition.

The carbon black utilized in Examples 43,45,47,48 and 50 was designated "Modified CB-A".

Carbon black CB-A is a carbon black produced by Cabot Corporation, Boston, Massachusetts which has a $N_2SA$ of 24 $m^2/g$ and a DBP of 132 ml/100 g. A Modified CB-A carbon black is produced utilizing the following procedure.

Two hundred grams of CB-A is added to a solution of 10.1 g sulfanilic acid and 6.23 g of concentrated nitric acid in 21 g of water. A solution of 4.87 g of $NaNO_2$ in 10 g of water is added to the rapidly stirring mixture. 4Sulfobenzenediazonium hydroxide inner salt is formed in situ, which reacts with the carbon black. After 15 minutes, the dispersion is dried in an oven at 125 C.

The resulting carbon black product is designated "Modified CB-A" and is a carbon black having attached 4C6H4SO3— groups.

EXAMPLE 39

This example illustrates a process wherein the surface of a metal oxide and/or organo-metal oxide gel composition is modified during preparation of the gel composition utilizing MEA (monoethanolamine) as at least one catalyst and ethanol as at least one esterification agent.

The steps from example 40 were essentially duplicated until the residual water content after repeated ethanol washing reached 0.5% by volume. At this point the gels were placed in a solution containing 2% by volume monoethanolamine (MEA, (supplied by Aldrich Chemical Co.) in ethanol at 50° C. for approximately 12 hours. After this step the gels were rinsed with fresh ethanol a few times and then the ethanol is washed free from the gel with n-heptane as before. This is done is a series of exchanges over 6 hours at 50° C. After the ethanol has been replaced with n-heptane, the gels are placed in a chamber and vacuum dried. After vacuum drying the gels are placed in a convection oven at 130° C. to remove trace amounts of residual solvent. The sample had a bulk density of 0.17 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 40

This example illustrates a process wherein the surface of a metal oxide and/or organo-metal oxide gel composition is modified during preparation of the gel composition utilizing MEA (monoethanolamine) as at least one catalyst and ethanol as at least one esterification agent.

All the steps from example 40 were repeated except the silica content was adjusted such that it represented 9% by weight. The sample had a bulk density of 0.15 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 41

This example illustrates a process wherein the surface of a metal oxide and/or organo-metal oxide gel composition is modified during preparation of the gel composition utilizing MEA (monoethanolamine) as at least one catalyst and ethanol as at least one esterification agent.

All the steps from example 40 were repeated except the silica content was adjusted such that it represented 8% by weight. The sample had a bulk density of 0.12 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 42

This example illustrates a process wherein the surface of a metal oxide and/or organo-metal oxide gel composition is modified during preparation of the gel composition utilizing MEA (monoethanolamine) as at least one catalyst and ethanol as at least one esterification agent.

All the steps from example 40 were repeated with a change in the composition. After the sodium silicate solution was added such that the pH of the sol was between 1.3 and 2.0, Modified CB-A carbon black was added to the sol such that the overall solids content (silica+carbon) was maintained at 8% and the carbon content as a percentage of the total solids was 15%.

All other steps were kept the same as in example 40. The sample had a bulk density of 0.11 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 43

This example illustrates a process wherein the surface of a metal oxide and/or organo-metal oxide gel composition is modified during preparation of the gel composition utilizing MEA (monoethanolamine) as at least one catalyst and ethanol as at least one esterification agent.

All the steps from example 40 were repeated except the silica content was adjusted such that it represented 7% by weight. The sample had a bulk density of 0.10 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 44

This example illustrates a process wherein the surface of a metal oxide and/or organo-metal oxide gel composition is modified during preparation of the gel composition utilizing MEA (monoethanolamine) as at least one catalyst and ethanol as at least one esterification agent.

All the steps from example 40 were repeated with a change in the composition. After the sodium silicate solution was added such that the pH of the sol was between 1.3 and 2.0, Modified CB-A carbon black was added to the sol such that the overall solids content (silica+carbon) was maintained at 6% and the carbon content as a percentage of the total solids was 15%. The sample had a bulk density of 0.12 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 45

This example illustrates a process wherein the surface of a metal oxide and/or organo-metal oxide gel composition is modified during preparation of the gel composition utilizing 2-MEA (2-methoxyethylamine) as at least one catalyst and ethanol as at least one esterification agent.

All the steps from example 40 were repeated except the silica content was adjusted such that it represented 5% by weight. The sample had a bulk density of 0.15 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 46

This example illustrates a process wherein the surface of a metal oxide and/or organo-metal oxide gel composition is modified during preparation of the gel composition utilizing 2-MEA (2-methoxyethylamine) as at least one catalyst and n-propanol as at least one esterification agent.

All the steps from example 40 were repeated with a change in the composition. After the sodium silicate solution was added such that the pH of the sol was between 1.3 and 2.0, Modified CB-A carbon black was added to the sol such that the overall solids content (silica+carbon) was maintained at 6% and the carbon content as a percentage of the total solids was 15%. N-propanol was used in place of ethanol and 2methoxyethylamine was used in place of the monoethanolamine. The sample had a bulk density of 0. 15 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 47

This example illustrates a process wherein the surface of a metal oxide and/or organo-metal oxide gel composition is modified during preparation of the gel composition utilizing 2-MEA (2-methoxyethylamine) as at least one catalyst and methanol as at least one esterification agent.

All the steps from example 40 were repeated with a change in the composition. After the sodium silicate solution was added such that the pH of the sol was between 1.3 and 2.0, Modified CB-A carbon black was added to the sol such that the overall solids content (silica+carbon) was maintained at 5% and the carbon content as a percentage of the total solids was 15%. Ethanol and 2-methoxyethylamine was used in place of the monoethanolamine. The sample had a bulk density of 0.22 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 48

This example illustrates a process wherein the surface of a metal oxide and/or organo-metal oxide gel composition is modified during preparation of the gel composition utilizing 2-MEA (2-methoxyethylamine) as at least one catalyst and n-butanol as at least one esterification agent.

All the steps from example 40 were repeated except the silica content was adjusted such that it represented 5% by weight and n-butanol was used in place of ethanol and 2methoxyethylamine was used in place of the monoethanolamine. In order to completely replace the water with n-butanol, tert-butanol was used as a co-solvent. The sample had a bulk density of 0.33 g/cm$^3$ and was subjected to Thermal Gravimetric Analysis and hydrophobicity analysis utilizing the procedures described above. The results, and the calculated number of surface ester groups per square nanometer, are reported in Table 1 below.

EXAMPLE 49

This example illustrates a process wherein the surface of a metal oxide and/or organo-metal oxide gel composition is modified during preparation of the gel composition utilizing 2-MEA (2-methoxyethylamine) as at least one catalyst and n-hexanol as at least one esterification agent.

All the steps from example 40 were repeated with a change in the composition. After the sodium silicate solution was added such that the pH of the sol was between 1.3 and 2.0, Modified CB-A carbon black was added to the sol such that the overall solids content (silica+carbon) was maintained at 5% and the carbon content as a percentage of the total solids was 15%. N-hexanol was used in place of ethanol and 2methoxyethylamine was used in place of the monoethanolamine. In order to completely replace the water with n-hexanol, tert-butanol was used as a co-solvent. The sample had a bulk density of 0.31 g/cm$^3$ and was subjected to Thermal Gravimetric Analysis and hydrophobicity analysis utilizing the procedures described above. The results, and the calculated number of surface ester groups per square nanometer, are reported in Table 1 below.

The results from the analysis of the sample produced in each Example are reported in Table 1 below.

TABLE 1

| Ex. | Comp Ex. | Substrate | Ester. Agent | Catalyst | TGA | #/nm$^2$ | % Ester. | Hydro |
|---|---|---|---|---|---|---|---|---|
| — | 1 | Fumed SiO$_2$ | ethanol | None | 1.3%, very broad | 0.44 | 10.2 | No |
| — | 2 | Fumed SiO$_2$ | n-butanol | None | 4%, broad | 0.85 | 26.5 | No |
| — | 3 | Fumed SiO$_2$ | t-butanol | None | 0.5%, broad | 0.11 | 3.4 | No |
| — | 4 | Fumed SiO$_2$ | n-hexanol | None | 3.3%, broad | 0.51 | 19.6 | No |
| 5 | — | Fumed SiO$_2$ | MEA | MEA | 9.2%, very broad | 2.38 | 55.3 | No |
| 6 | — | Fumed SiO$_2$ | 2-MEA | 2-MEA | 8.1%, very broad | 1.70 | 51.5 | No |
| 7 | — | Fumed SiO$_2$ | DMBA | DMBA | 4.7%, very broad | 0.73 | 30.4 | No |
| 8 | — | Fumed SiO$_2$ | methanol | MEA | 4.2%, broad | 2.07 | 37.6 | No |
| 9 | — | Fumed SiO$_2$ | ethanol | MEA | 2.9% sharp, 5.8% total | 1.99 | 46.3 | No |
| 10 | — | Fumed SiO$_2$ | ethanol | 2-MEA | 1.8% sharp, 4.3% total | 1.47 | 34.2 | No |
| 11 | — | Fumed SiO$_2$ | n-propanol | MEA | 4.7% sharp, 6% total | 1.58 | 42.7 | Yes |
| 12 | — | Fumed SiO$_2$ | n-butanol | MEA | 6.3% sharp, 7.4% total | 1.58 | 49.4 | Yes |
| 13 | — | Fumed SiO$_2$ | t-butanol | MEA | 1.2% very broad | 0.26 | 8.1 | No |
| 14 | — | Fumed SiO$_2$ | n-butanol/ t-butanol | MEA | 2% sharp, 4% total | 0.85 | 26.5 | No |
| 15 | — | Fumed SiO$_2$ | n-butanol | 2-MEA | 5.9% sharp, 7% total | 1.49 | 46.6 | Yes |
| 16 | — | Fumed SiO$_2$ | n-butanol | DMBA | 5.2% sharp, 5.6% total | 1.19 | 37.2 | Yes |
| 17 | — | Fumed SiO$_2$ | n-butanol | DMEA | 6.4% sharp, 7.4% total | 1.49 | 46.6 | Yes |
| 18 | — | Fumed SiO$_2$ | n-butanol | DEA | 5% sharp, 7.5% total | 1.60 | 50.0 | Yes |
| 19 | — | Fumed SiO$_2$ | n-butanol | DABCO | 5.8% sharp, 6.4% total | 1.36 | 42.5 | Yes |
| 20 | — | Fumed SiO$_2$ | n-butanol | piperdine | 6.7% sharp, 7.5% total | 1.60 | 50.0 | Yes |
| 21 | — | Fumed SiO$_2$ | n-hexanol | MEA | 7.4% sharp, 8.5% total | 1.31 | 50.4 | Yes |
| 22 | — | Fumed SiO$_2$ | n-hexanol | 2-MEA | 46% sharp, 7.4% total | 1.14 | 43.8 | Yes |
| 23 | — | Fumed SiO$_2$ | n-hexanol | DEA | 7% sharp, 9.7% total | 1.50 | 57.7 | Yes |
| 24 | — | Fumed SiO$_2$ | allyl alcohol | 2-MEA | 2.5% sharp, 8% total | 2.18 | 55.9 | No |
| 25 | — | Fumed SiO$_2$ | n-octanol | MEA | 11.4% sharp, 12% total | 1.46 | 66.4 | Yes |
| 26 | — | Fumed SiO$_2$ | ethylene glycol | 2-MEA | 6.2% sharp, 7.3% total | 1.86 | 41.3 | Yes |
| 27 | — | Fumed SiO$_2$ | 1,2 propylene glycol | 2-MEA | 2.5% sharp, 7% total | 1.45 | 35.4 | No |
| 28 | — | Fumed SiO$_2$ | trifluoroethanol | 2-MEA | 1.5% sharp, 3% total | 0.47 | 11.5 | No |
| 29 | — | Fumed SiO$_2$ | phenol | 2-MEA | 11% broad | 1.85 | 56.1 | No |
| 30 | — | Dry SiO$_2$ gel | 1,2 propylene glycol | 2-MEA | 6% sharp, 16% total | 2.10 | 51.2 | No |
| 31 | — | Dry SiO$_2$ gel | trifluoroethanol | 2-MEA | 12% broad | 1.19 | 29.0 | No |
| 32 | — | Dry SiO$_2$ gel | phenol | 2-MEA | 23% broad | 2.44 | 73.9 | No |
| 33 | — | Dry SiO$_2$ gel | allyl alcohol | 2-MEA | 4% sharp, 15% total | 2.58 | 66.1 | NM |
| 34 | — | Dry SiO$_2$ gel | allyl alcohol/ n-butanol | 2-MEA | 4.2% sharp, 7.8% total | NM | NM | Yes |
| 35 | — | Precip SiO$_2$ | n-butanol | 2-MEA | 7% sharp, 10% total | 1.47 | 45.9 | Yes |

TABLE 1-continued

| Ex. | Comp Ex. | Substrate | Ester. Agent | Catalyst | TGA | #/nm$^2$ | % Ester. | Hydro |
|---|---|---|---|---|---|---|---|---|
| 36 | — | TiO$_2$ | n-butanol | 2-MEA | 1% broad | 1.57 | 49.1 | No |
| 37 | — | Al$_2$O$_3$ | n-butanol | 2-MEA | 0.5% broad | 3.93 | 122.8 | No |
| — | 38 | Wet SiO$_2$ gel | ethanol | none | 3.7% broad | 0.80 | 18.6 | No |
| 39 | — | Wet SiO$_2$ gel | ethanol | MEA | 11.7% sharp, 13% total | 2.82 | 65.6 | Yes |
| 40 | — | Wet SiO$_2$ gel | ethanol | MEA | 10.3% sharp, 12% total | 2.60 | 60.5 | Yes |
| 41 | — | Wet SiO$_2$ gel | ethanol | MEA | 11% sharp, 12% total | 2.60 | 60.5 | Yes |
| 42 | — | Wet SiO$_2$/CB gel | ethanol | MEA | 7.5% sharp, 9% total | 1.95 | 45.3 | Yes |
| 43 | — | Wet SiO$_2$ gel | ethanol | MEA | 10.2% sharp, 11.6% total | 2.52 | 58.6 | Yes |
| 44 | — | Wet SiO$_2$/CB | ethanol | MEA | 8.5% sharp, 9.5% total | 2.06 | 47.9 | Yes |
| 45 | — | Wet SiO$_2$ gel | ethanol | MEA | 9% sharp, 11% total | 2.39 | 55.6 | Yes |
| 46 | — | Wet SiO$_2$/CB gel | n-propanol | MEA | 12.3% sharp, 14% total | 2.33 | 63.0 | Yes |
| 47 | — | Wet SiO$_2$/CB gel | methanol | 2-MEA | 2% sharp, 3.8% total | 1.19 | 21.6 | No |
| 48 | — | Wet SiO$_2$ gel | n-butanol | 2-MEA | 15% sharp, 17% total | 2.29 | 71.5 | Yes |
| 49 | — | Wet SiO$_2$/CB gel | n-hexanol | 2-MEA | 12.9% sharp, 14% total | 1.37 | 52.7 | Yes |

Ester. agent. = esterification agent; TGA = Thermogravimetric Analysis Weight Loss; % Ester. = % of Surface Esterification
/nm$^2$ = number of surface ester groups per square nanometer (calculated)
Hydro = Hydrophobic; Wet SiO$_2$ gel = process performed during preparation of the gel;
Precip. = precipitated; MEA = monoethanolamine; 2-MEA = 2-methoxyethylamine;
DMBA = dimethylbutylamine; DMEA = dimethylethanolamine; DEA = diethanolamine
DABCO = triethylenediamine; NM = Not Measured The results set forth in Table 1 illustrate that processes of the present invention may be utilized to esterify the surface of metal oxide and/or organo-metal oxide compositions.

It should be clearly understood that the forms of the present invention herein described are illustrative only and are not intended to limit the scope of the invention.

We claim:

1. A process for producing surface modified metal oxide and/or organo-metal oxide compositions comprising esterifying at least a portion of a surface of a metal oxide and/or organo-metal oxide composition through contact with at least one esterification agent and at least one catalyst at a pressure less than or equal to 300 psia wherein the esterification agent and catalyst are in the liquid phase to produce a hydrophobic esterfied metal oxide and/or organo-metal oxide composition.

2. The process of claim 1 wherein the surface is contacted by the esterfication agent in the presence of the catalyst.

3. The process of claim 1 wherein the surface is sequentially contacted by the esterification agent and the catalyst.

4. The process of claim 3 wherein the surface is contacted first by the esterfication agent and then by the catalyst.

5. The process of claim 3 wherein the surface is contacted first by the catalyst and then by the esterification agent.

6. The process of claim 1 wherein at least 20% of the surface of the metal oxide and/or organo-metal oxide composition is esterified.

7. The process of claim 1 wherein the esterification agent comprises an alcohol.

8. The process of claim 7 wherein the catalyst comprises an amine.

9. The process of claim 8 wherein the catalyst and the esterification agent are monoethanolamine.

10. The process of claim 7 wherein the alcohol comprises an unbranched primary C$_1$ to C$_{10}$ hydrocarbon.

11. The process of claim 1 wherein the catalyst comprises a base.

12. The process of claim 1 wherein the metal oxide and/or organo-metal oxide composition comprises: a metal oxide and/or organo-metal oxide gel composition or a fumed metal oxide and/or organo-metal oxide.

13. The process of claim 1 wherein the esterification agent is a diol.

14. The process of claim 13 wherein the esterification agent is a sulfur-substituted diol.

15. The process of claim 1 wherein the esterification agent comprises a vinyl group.

16. The process of claim 1 wherein the metal oxide and/or organo-metal oxide composition comprises silica.

17. The process of claim 16 wherein the metal oxide and/or organo-metal oxide composition further comprises carbon black.

18. The process of claim 1 wherein said esterifying is conducted at a temperature less than or equal to the atmospheric boiling point of said esterification agent.

19. The process of claim 18 wherein said esterification agent comprises an alcohol.

20. The process of claim 19 wherein the catalyst comprises an amine.

21. The process of claim 20 wherein the esterification agent and catalyst are monoethanolamine.

22. The process of claim 18 wherein the catalyst comprises a base.

23. The process of claim 18 wherein the esterification agent is a diol.

24. The process of claim 18 wherein the metal oxide and/or organo-metal oxide composition comprises silica.

25. The process of claim 24 wherein the metal oxide and/or organo-metal oxide composition further comprises carbon black.

* * * * *